United States Patent
Broussard

(10) Patent No.: US 7,493,727 B1
(45) Date of Patent: Feb. 24, 2009

(54) EXTENDABLE AND RETRACTABLE ENCLOSURE FOR A STRUCTURE

(76) Inventor: Frederick Broussard, 207 Rainbow Dr., PMB#10791, Livingston, TX (US) 77399

(*) Notice: Subject to any disclaimer, the term of this patent is extended or adjusted under 35 U.S.C. 154(b) by 672 days.

(21) Appl. No.: 11/106,070

(22) Filed: Apr. 14, 2005

Related U.S. Application Data

(60) Provisional application No. 60/565,990, filed on Apr. 27, 2004.

(51) Int. Cl.
E05D 15/50 (2006.01)

(52) U.S. Cl. .............................. 49/139; 49/149; 49/163; 49/168; 49/169; 49/193; 296/26.01; 296/26.14; 296/165; 296/169; 296/172; 296/174; 296/175; 296/176; 296/156

(58) Field of Classification Search ................. 49/149, 49/163, 168, 169, 193; 296/26.01, 26.1, 296/26.14, 165, 169–172, 174–176
See application file for complete search history.

(56) References Cited

U.S. PATENT DOCUMENTS

| | | | | |
|---|---|---|---|---|
| 232,883 A * | 10/1880 | Carey, Jr. | | 49/168 |
| 254,752 A * | 3/1882 | Wickes | | 160/198 |
| 564,413 A * | 7/1896 | Stillwell | | 160/180 |
| 1,375,186 A * | 4/1921 | Sincak | | 49/163 |
| 1,628,879 A * | 5/1927 | Gillman | | 49/152 |
| 2,374,618 A * | 4/1945 | Perreton | | 49/153 |
| 2,557,037 A * | 6/1951 | Rooney | | 312/227 |
| 2,611,936 A * | 9/1952 | Wheeler | | 160/54 |
| 2,656,688 A * | 10/1953 | Hinkel | | 62/441 |
| 4,375,306 A * | 3/1983 | Linder | | 312/249.9 |
| 4,413,726 A * | 11/1983 | Davidson | | 206/45.29 |
| 4,475,761 A * | 10/1984 | Milroy et al. | | 296/61 |
| 4,512,477 A * | 4/1985 | Densen | | 206/577 |
| 5,029,935 A * | 7/1991 | Dufrancatel | | 296/156 |
| 5,100,196 A * | 3/1992 | Dodgen | | 296/156 |
| 5,301,992 A * | 4/1994 | Whitmore | | 296/37.1 |
| 5,399,008 A * | 3/1995 | Vann, Jr. | | 312/227 |
| 5,535,550 A * | 7/1996 | Yang | | 49/163 |
| 5,560,667 A * | 10/1996 | Edry | | 296/26.12 |
| 5,908,215 A * | 6/1999 | Hanser et al. | | 296/26.15 |
| 6,227,607 B1 * | 5/2001 | Dewald et al. | | 296/165 |
| 6,526,694 B1 * | 3/2003 | Cosgrove | | 49/67 |
| 6,536,821 B1 * | 3/2003 | Gardner | | 296/26.01 |
| 6,568,734 B2 * | 5/2003 | Buls et al. | | 296/26.12 |
| 6,637,160 B2 * | 10/2003 | Brooks | | 52/66 |
| 6,668,487 B2 * | 12/2003 | Vesey | | 49/169 |
| 6,681,524 B1 * | 1/2004 | Tillson | | 49/169 |
| 6,742,979 B1 * | 6/2004 | Salazar | | 414/522 |
| 6,843,023 B2 * | 1/2005 | Liu | | 49/143 |
| 6,854,787 B2 * | 2/2005 | Gehman et al. | | 296/171 |
| 7,083,213 B1 * | 8/2006 | Crean | | 296/26.13 |
| 7,150,482 B1 * | 12/2006 | Blodgett et al. | | 296/26.13 |

(Continued)

Primary Examiner—Katherine W Mitchell
Assistant Examiner—Jeff Tang
(74) Attorney, Agent, or Firm—Ted Masters

(57) ABSTRACT

An extendable and retractable enclosure provides an additional storage or work area in a structure which has a limited amount of available space, such as a motor home or trailer. The enclosure is installed in an opening, such as for a window, and can be selectively moved to an extended position where the enclosure extends outside the structure, or to a retracted position where the enclosure is positioned inside the structure. Two spaced apart swing arms pivotally mount the enclosure to the structure, and allow the enclosure to be selectively moved to the extended or retracted positions.

13 Claims, 7 Drawing Sheets

U.S. PATENT DOCUMENTS

| | | | |
|---|---|---|---|
| 7,175,219 B1 * | 2/2007 | Blodgett, Jr. | 296/26.14 |
| 7,204,536 B2 * | 4/2007 | Kunz | 296/26.01 |
| 7,287,806 B1 * | 10/2007 | Crean | 296/165 |
| 7,305,795 B1 * | 12/2007 | Tooman | 49/164 |
| 2002/0074815 A1 * | 6/2002 | McManus et al. | 296/26.01 |
| 2002/0171255 A1 * | 11/2002 | Eichhorn | 296/26.01 |
| 2003/0051407 A1 * | 3/2003 | Sosa | 49/193 |
| 2003/0074841 A1 * | 4/2003 | Vesey | 49/169 |
| 2003/0107229 A1 * | 6/2003 | Meijer et al. | 296/26.01 |
| 2004/0026958 A1 * | 2/2004 | Condino | 296/156 |
| 2004/0172881 A1 * | 9/2004 | Minami | 49/193 |
| 2007/0157521 A1 * | 7/2007 | Ito et al. | 49/185 |

* cited by examiner

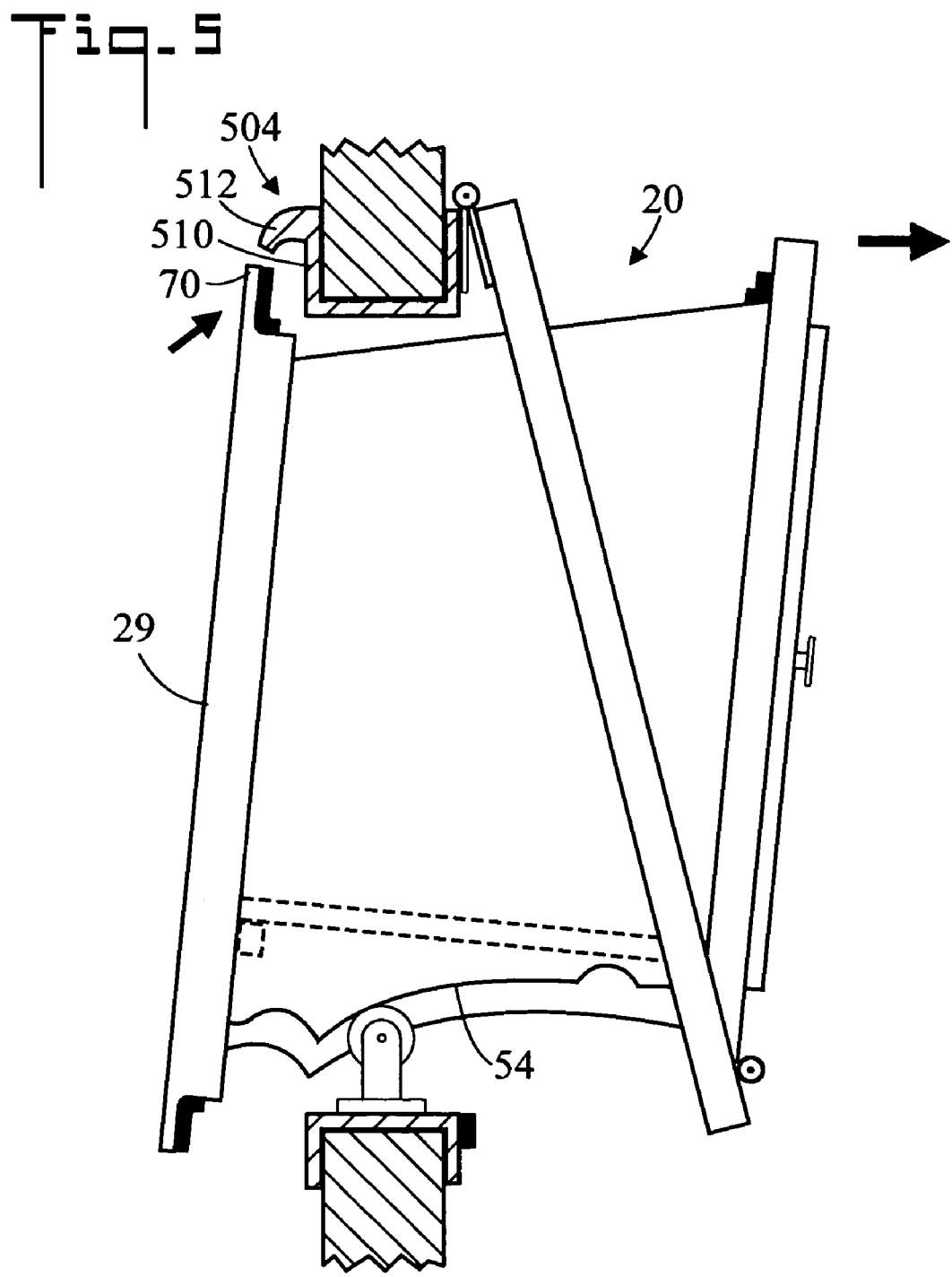

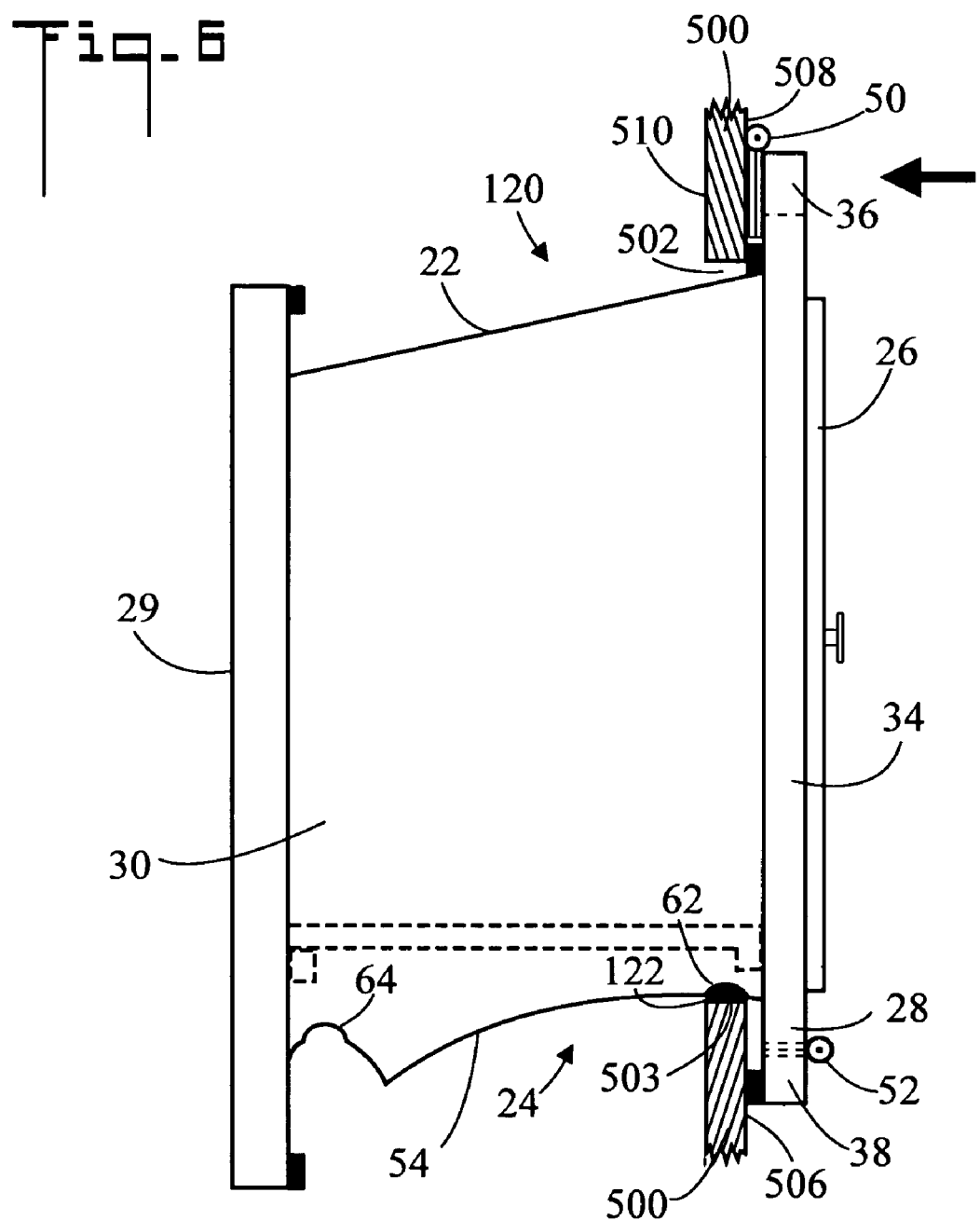

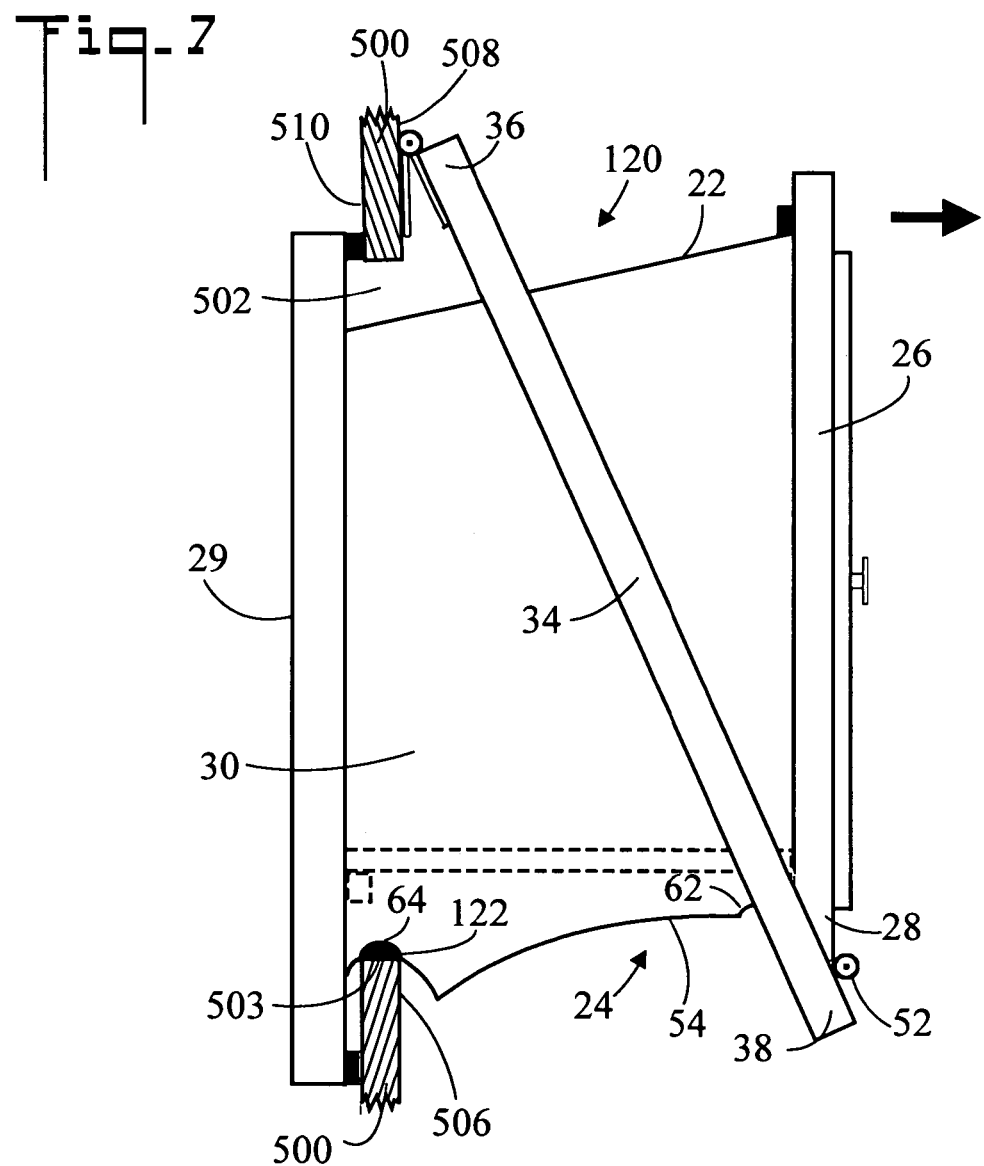

EXTENDABLE AND RETRACTABLE ENCLOSURE FOR A STRUCTURE

CROSS REFERENCE TO RELATED APPLICATION

This application claims the filing benefit under 35 U.S.C. §119(e) of U.S. Provisional Application No. 60/565,990, filed Apr. 27, 2004, which is included herein by reference.

TECHNICAL FIELD

The present invention pertains generally to structures such as trailers and motor homes, and more particularly to an extendable and retractable enclosure which may be used to increase the volume of the structure.

BACKGROUND OF THE INVENTION

Structures such as trailers, $5^{th}$ wheel trailers, motor homes, and the like contain a limited amount of space. As such, the storage of articles and the availability of workspace can be troublesome.

BRIEF SUMMARY OF THE INVENTION

The present invention is directed to an extendable and retractable enclosure which is mounted in an aperture in the wall of the structure such as a motor home or trailer, and can be moved from an extended in-use position wherein the enclosure protrudes outwardly from the wall (outside the structure), to a retracted (stowed) position wherein the enclosure protrudes inwardly from the wall (inside the structure). In the extended position, the enclosure provides additional living or storage space. The retracted position would typically be utilized when the structure is being moved. Because of the design of the present invention, the enclosure remains reasonably level during the transition from the extended to retracted positions. As such, any contents of the enclosure will not be unduly tilted.

The enclosure can be retrofitted into an existing aperture, such as for a window, or alternatively could be included as original equipment with the structure. Locking devices of various trade designs may be used to secure the enclosure in the extended and retracted positions. Additionally, the top, bottom, rear, or sides of the enclosure may include ventilation and/or light transmitting devices.

Uses of the enclosure of the present invention can include, a computer workspace, a general utility work space (crafts and other hobby space), a pantry, a media cabinet, an atrium or greenhouse, a solar room heater, a solar clothes dryer, a bird or other pet area, a linen cabinet, a bookcase, a medical cabinet, and storage for miscellaneous items.

In accordance with preferred embodiment of the invention, an extendable and retractable enclosure for a structure having a wall having an aperture having a perimeter, a frame disposed around the perimeter of the aperture, the frame having a bottom portion, an inside top portion, an outside top portion, and a downwardly projecting lip horizontally disposed along the outside top portion, the enclosure including:

a top, a bottom, a front having a bottom portion, a rear, a first side and an opposite second side;

a first swing arm having a top end and an opposite bottom end;

a second swing arm having a top end and an opposite bottom end, the second swing arm spaced apart from the first swing arm;

the top ends of the first and second swing arms pivotally connectable to the inside top portion of the frame;

the bottom ends of the first and second swing arms pivotally connectable to the bottom portion of the front; and, wherein the swing arms movably support the enclosure, and allow the enclosure to be selectively moved to one of (1) an extended position wherein the enclosure protrudes outwardly from the wall, and (2) a retracted position wherein the enclosure protrudes inwardly from the wall.

In accordance with an aspect of the invention, a top member connects the top end of the first swing arm to the top end of the second swing arm. A bottom member connects the bottom end of the first swing arm to the bottom end of the second swing arm. A first elongated hinge is connectable between the inside top portion of the frame and the top member. And, a second elongated hinge is connectable between the bottom member and the bottom portion of the front.

In accordance with another aspect of the invention, the bottom of the enclosure includes a first curved portion spaced apart from a second curved portion.

In accordance with another aspect of the invention, first and second spaced apart rollers are connectable to the bottom portion of the frame, wherein the first and second rollers upwardly project from the bottom portion of the frame. The first roller engaging the first curved portion, and the second roller engaging the second curved portion.

In accordance with another aspect of the invention, the first and second rollers each include a biasing mechanism which urges the rollers in an upward direction.

In accordance with another aspect of the invention, the first curved portion includes first and second notches for receiving the first roller, and the second curved portion includes first and second notches for receiving the second roller. The first notches being for receiving the rollers when the enclosure is in the extended position, and the second notches being for receiving the rollers when the enclosure is in the retracted position.

In accordance with another aspect of the invention, the rear of the enclosure having a top horizontal lip. The first and second spaced apart curved portions shaped and dimensioned so that when the enclosure is moved to the retracted position, the top horizontal lip of the rear becomes seated under the downwardly projecting lip of the outside top portion of the frame.

In accordance with another aspect of the invention, the top of the enclosure forming an acute angle with the front of the enclosure.

In accordance with another preferred embodiment of the invention, an extendable and retractable enclosure for a structure having a wall having an aperture, the aperture having a bottom edge, an inside top portion, and an outside top portion, the enclosure including:

a top, a bottom, a front having a bottom portion, a rear, a first side and an opposite second side;

a first swing arm having a top end and an opposite bottom end;

a second swing arm having a top end and an opposite bottom end, the second swing arm spaced apart from the first swing arm;

the top ends of the first and second swing arms pivotally connectable to the inside top portion of the aperture;

the bottom ends of the first and second swing arms pivotally connectable to the bottom portion of the front; and, wherein the swing arms movably support the enclosure, and allow the enclosure to be selectively moved to one of (1) an extended position wherein the enclosure protrudes outwardly from the wall, and (2) a retracted position wherein the enclosure protrudes inwardly from the wall.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 5 is a side elevation view of the extendable and retractable enclosure moving from the extended position to the retracted position;

FIG. 6 is a side elevation view of a second embodiment of the extendable and retractable enclosure in the extended position; and, FIG. 7 is a side elevation view of the second embodiment of the extendable and retractable enclosure in the retracted position.

DETAILED DESCRIPTION OF THE INVENTION

Figure 1:
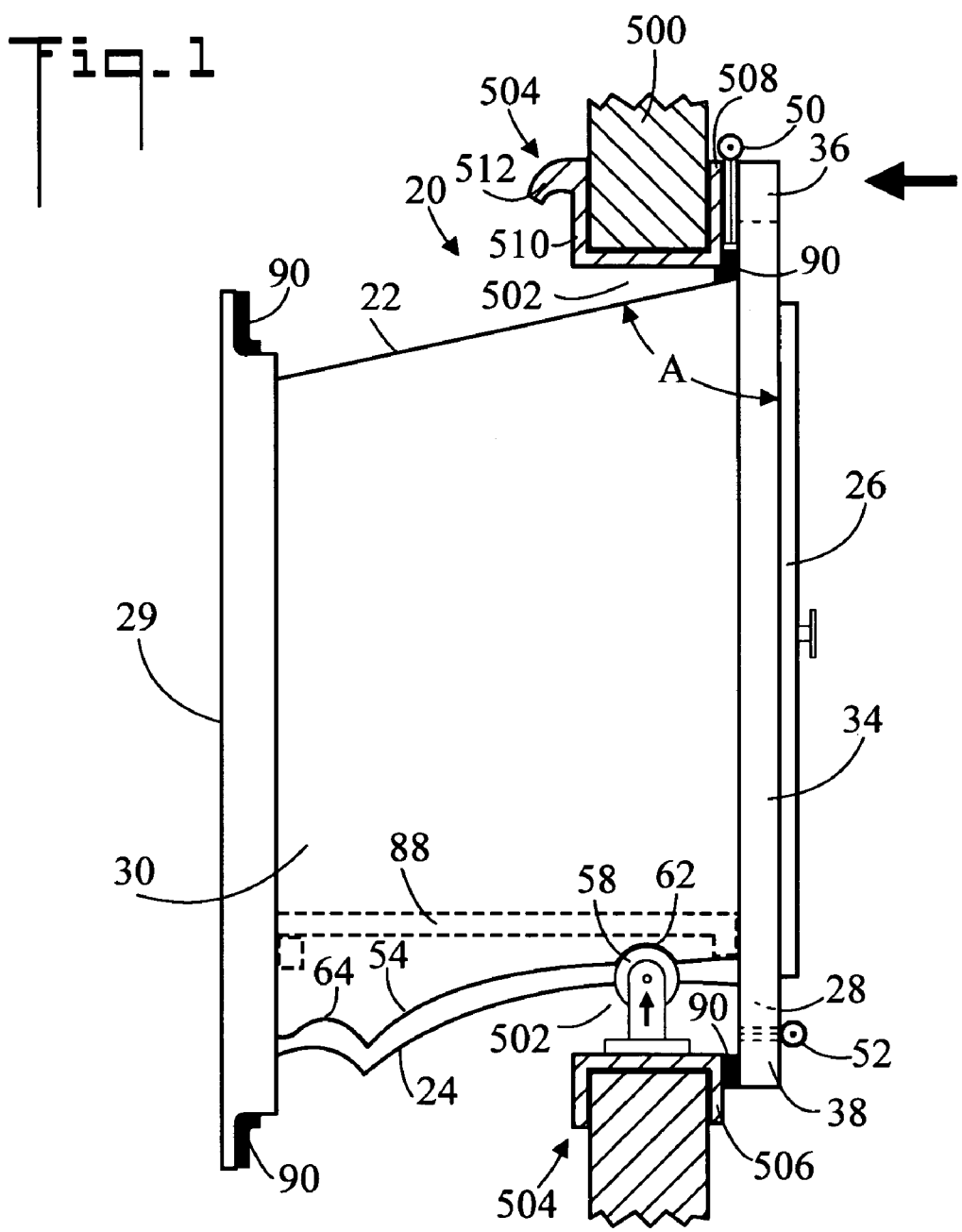
FIG. 1 is a side elevation view of an extendable and retractable enclosure for a structure in accordance with the present invention, the extendable and retractable enclosure shown in an extended position.
Figure 2:
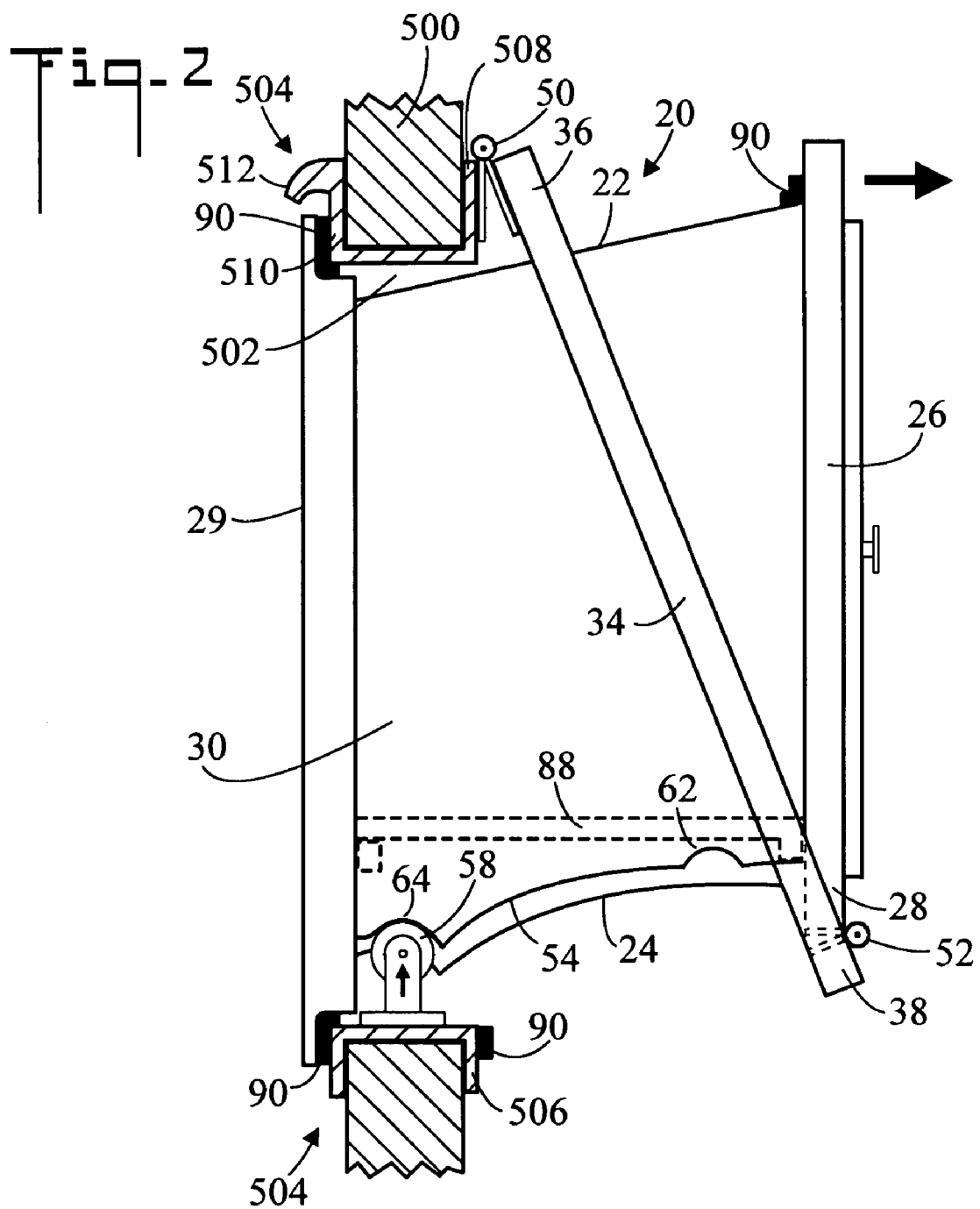
FIG. 2 is a side elevation view of the extendable and retractable enclosure shown in a retracted position.
Figure 3:
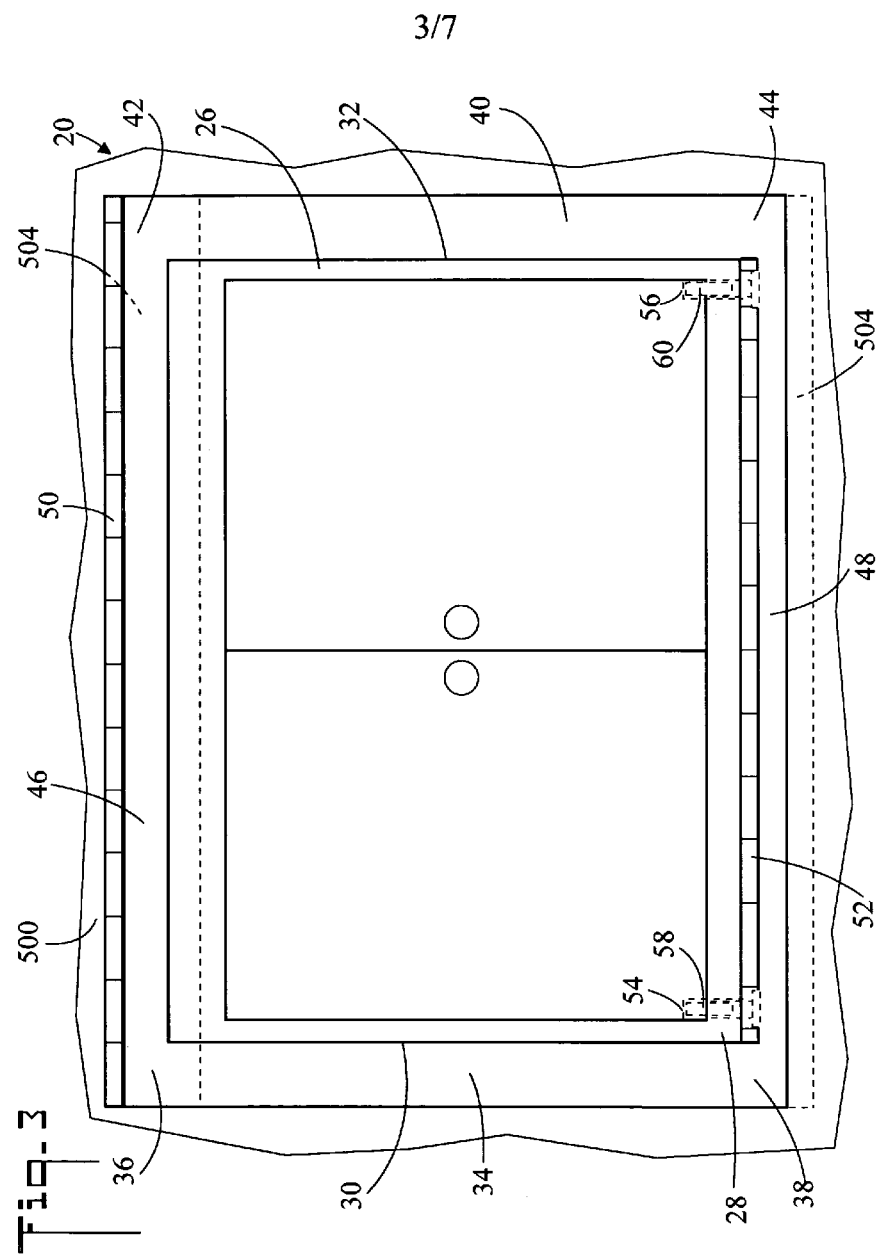
FIG. 3 is a front elevation view of the extendable and retractable enclosure in the extended position.
Figure 4:
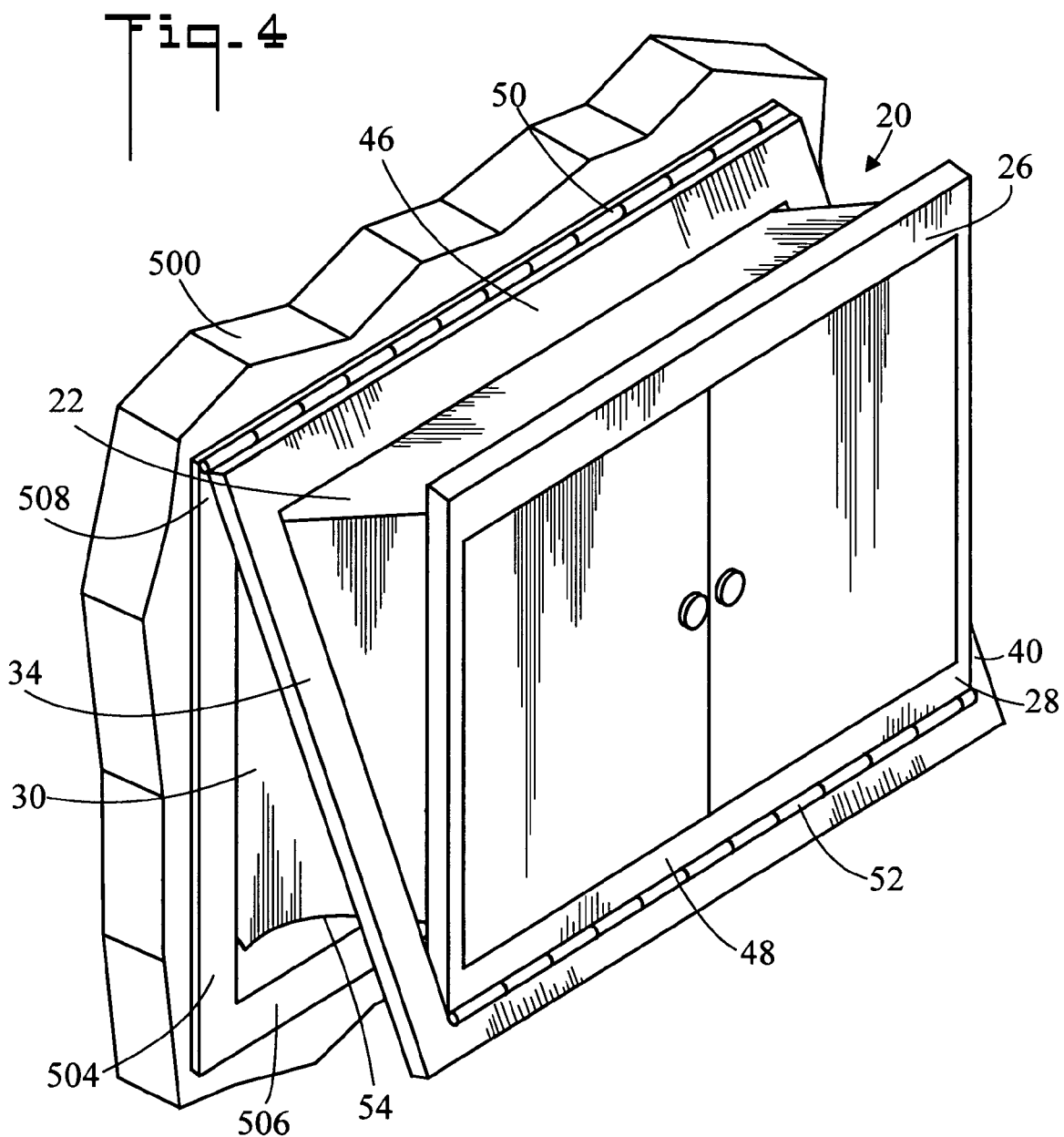
FIG. 4 is a perspective view of the extendable and retractable enclosure in the retracted position.

Referring initially to FIGS. 1-4, there are illustrated side elevation extended, side elevation retracted, front elevation extended, and perspective retracted views respectively of an extendable and retractable enclosure for a structure in accordance with the present invention, generally designated as 20. Extendable and retractable enclosure 20 is mounted on a structure having a wall 500 having an aperture 502 having a perimeter. A frame 504 is disposed around the perimeter of aperture 502. Frame 504 has a bottom portion 506, an inside top portion 508, an outside top portion 510, and a downwardly projecting lip 512 horizontally disposed along outside top portion 510. In FIGS. 1 and 2, wall 500 and frame 504 are shown in cross section for clarity.

Enclosure 20 has a top 22, a bottom 24, a front 26 having a bottom portion 28, a rear 29, a first side 30 and an opposite second side 32. A first swing arm 34 has a top end 36 and an opposite bottom end 38. A second swing arm 40 has a top end 42 and an opposite bottom end 44, second swing arm 40 spaced apart from first swing arm 34 wherein first swing arm 34 is outside first side 30 and second swing arm 40 is outside second side 32. Top ends 36 and 42 of first 34 and second 40 swing arms respectively are pivotally connectable to inside top portion 508 of frame 504. Bottoms ends 38 and 44 of first 34 and second 40 swing arms respectively are pivotally connectable to bottom portion 28 of front 26.

In an embodiment of the invention, a top member 46 connects top end 36 of first swing arm 34 to top end 42 of second swing arm 40, and a bottom member 48 connects bottom end 38 of first swing arm 34 to bottom end 44 of second swing arm 40. In other words, first swing arm 34, second swing arm 40, top member 46, and bottom member 48 form a frame-like structure which supports enclosure 20. A first elongated hinge 50 is connectable between inside top portion 508 of frame 504 and top member 46. A second elongated hinge 52 is connectable between bottom member 48 and bottom portion 28 of front 26. Swing arms 34 and 40 movably support enclosure 20, and allow enclosure 20 to be selectively moved to one of (1) an extended position wherein enclosure 20 protrudes outwardly from wall 500 (FIG. 1), and (2) a retracted position wherein enclosure 20 protrudes inwardly from wall 500 (FIG. 2). It is important that swing arms 34 and 40 be sufficiently rigid to ensure the enclosure 20 movement is perpendicular to aperture 502. Otherwise, enclosure 20 will bind if side to side "cocking" occurs during extension and retraction. Top member 46 and bottom member 48 in conjunction with swing arms 34 and 40 provide ridged support for enclosure 20. It is further important for hinges 50 and 52 to be mounted parallel to the wall 500 and parallel to each other. Other hinging arrangements are also possible so long as cocking will not occur.

It is noted that top 22 of enclosure 20 forms an acute angle A with front 26. In other words, top 22 angles down slightly. This angle is necessary in order for top 22 to clear frame 504 of aperture 502 as enclosure 20 is moved from the retracted position of FIG. 2 to the extended position of FIG. 1.

Bottom 24 of enclosure 20 includes a contoured first curved portion 54 spaced apart from a second curved portion 56. Curved portions 54 and 56 cooperate with first 58 and second 60 spaced apart rollers respectively which are connectable to the bottom portion 506 of frame 504, wherein the first 58 and second 60 rollers upwardly project from bottom portion 506 of frame 504. First roller 58 engages first curved portion 54, and second roller 60 engages second curved portion 56 of bottom 24 as enclosure 20 is moved between the extended and retracted positions. In the shown embodiment rollers 58 and 60 ride in cutout portions along the bottom 24 and sides 30 and 32 of enclosure 20. The purpose of the shaped bottom is to cause enclosure 20 to remain effectively upright (not tilting) as it is retracted and extended. First 58 and second 60 rollers each include a biasing mechanism which urges rollers 58 and 60 in an upward direction thereby pushing enclosure 20 slightly upward. This ensures that enclosure 20 is vertically positioned properly. First curved portion 54 includes first 62 and second 64 notches for receiving first roller 58. Similarly, opposite second curved portion 56 includes first and second notches (not shown) for receiving second roller 60. Wherein the first notches are for receiving rollers 58 and 60 respectively when enclosure 20 is in the extended position of FIG. 1, and the second notches are for receiving rollers 58 and 60 when enclosure 20 is in the retracted position of FIG. 2. It may be appreciated that while the first and second notches of second curved portion 56 are not specifically shown in the drawings, these elements are contained on second side 32, and are in the same physical relationship as first 62 and second 64 notches shown in FIGS. 1 and 2. The notches serve to mechanically retain enclosure 20 in either the extended or retracted position.

Weather seals 90 are provided on all mating surfaces to prevent external weather conditions from penetrating the inside of the structure when enclosure 20 is in both the extended and retracted positions.

Doors are provided in the front 26 of enclosure 20 for securing the contents of enclosure 20. The doors are particularly useful when the present invention is installed in a motor vehicle or trailer. The doors are removable when not needed.

Enclosure 20 includes an inside bottom 88. This element covers the shaped bottom 24 to provide a flat working or storage surface.

Now referring to FIG. 5, there is illustrated a side elevation view of extendable and retractable enclosure 20 moving from the extended position to the retracted position. Back 29 of enclosure 20 includes a top horizontal lip 70. First 54 and second 56 spaced apart curved portions are shaped and dimensioned so that when enclosure 20 is moved to the retracted position, top horizontal lip 70 of back 29 becomes seated under downwardly projecting lip 512 of the outside top portion 510 of frame 504. In an embodiment of the invention, the contour of first 54 and second 56 curved portions causes enclosure 20 to tilt slightly as top lip 70 approaches downwardly projecting lip 512. This allows top lip 70 to seat underneath downwardly projecting lip 512. Downwardly projecting lip 512 serves to prevent water from entering the enclosure 20.

In terms of use, a method for selectively increasing and decreasing the volume of a structure includes:

(a) providing a structure having a wall 500 having an aperture 502 having a perimeter, a frame 504 disposed around the perimeter of the aperture 502, the frame 504 having a bottom portion 506, an inside top portion 508, an outside top portion 510, and a downwardly projecting lip 512 horizontally disposed along outside top portion 510;

(b) providing an enclosure 20 having a top 22, a bottom 24, a front 26 having a bottom portion 28, a 29, a first side 30 and an opposite second side 32, a first swing arm 34 having a top end 36 and an opposite bottom end 38, and a second swing arm 40 having a top end 42 and an opposite bottom end 44, second swing arm 40 spaced apart from first swing arm 34;

(c) pivotally connecting top ends 36 and 42 of first 34 and second 40 swing arms to inside top portion 508 of frame 504, and pivotally connecting bottom ends 38 and 44 of first 34 and second 40 swing arms to bottom portion 28 of front 26, wherein first 34 and second 40 swing arms movably support enclosure 20;

(d) selectively moving enclosure 20 to an extended position wherein enclosure 20 protrudes outwardly from wall 500; and, (e) selectively moving enclosure 20 to a retracted position wherein enclosure 20 protrudes inwardly from wall 500.

Now referring to FIGS. 6 and 7, there are illustrated side elevation views of a second embodiment of the extendable and retractable enclosure in the extended and retracted positions respectively, the second embodiment generally being designated 120. Second embodiment 120 is identical to first embodiment 20 except as follows, (1) the perimeter of aperture 502 in wall 500 is not surrounded by a frame, (2) the rollers are replaced with a friction reducing material 122 so that enclosure 120 will simply slide across friction reducing material 122. The bottom of enclosure 120 can also include a friction reducing material.

Extendable and retractable enclosure 120 is mounted on a structure having a wall 500 having an aperture 502, aperture 502 having a bottom edge 503, an inside top portion 508, and an outside top portion 510. Enclosure 120 includes a top 22, a bottom 24 a front 26 having a bottom portion 28, a rear 29, a first side 30 and an opposite second side 32. A first swing arm 34 has a top end 36 and an opposite bottom end 38. A second swing arm 40 (refer to FIG. 3) has a top end 42 and an opposite bottom end 44, second swing arm 40 is spaced apart from first swing arm 34. Top ends 36 and 42 of first 34 and second 40 swing arms respectively are pivotally connectable to inside top portion 508 of aperture 502. Bottom ends 38 and 44 of first 34 and second 40 swing arms respectively are pivotally connectable to bottom portion 28 of front 26. Wherein swing arms 34 and 40 movably support enclosure 120, and allow enclosure 20 to be selectively moved to one of (1) an extended position wherein enclosure 120 protrudes outwardly from wall 500, and (2) a retracted position wherein enclosure 120 protrudes inwardly from wall 500.

Referring also to FIGS. 1-4 and the discussion pertaining thereto, in an embodiment of the invention, a top member 46 connects top end 36 of first swing arm 34 to top end 42 of second swing arm 40, and a bottom member 48 connects bottom end 38 of first swing arm 34 to bottom end 44 of second swing arm 40. A first elongated hinge 50 is connectable between inside top portion 508 of aperture 502 and top member 46. A second elongated hinge is connectable between bottom member 48 and bottom portion 28 of front 26.

As with enclosure 20, top 22 forms and acute angle with front 26 of enclosure 120.

Just as with enclosure 20, bottom of enclosure 120 includes a curved portion 54, so that as enclosure 120 is moved curved portion 54 slides over bottom edge 503 of aperture 502. In an embodiment of the invention, bottom edge 503 includes a friction reducing material 122 so that enclosure 120 will readily slide. Bottom 24 can also include a friction reducing material to enhance the sliding action.

As with enclosure 20, curved portion 54 includes first 62 and second 64 notches for receiving bottom edge 503 of aperture 502. First notch 62 is for receiving bottom edge 503 of aperture 502 when enclosure 120 is in the extended position, and second notch 64 is for receiving bottom edge 503 of aperture 502 when enclosure 120 is in the retracted position.

Additional Description:

1. Wall 500 and window openings—Such openings (apertures) are typically provided in mobile living quarter vehicles such as recreational vehicles. An adapter plate opening can also be fitted onto or into an existing window opening. An adapter plate also allows standard sizes of the present invention to fit various window opening sizes. Enclosure 20 is extended for use while the vehicle is stationary and not under space limiting restrictions. Enclosure 20 is usually retracted for travel when limitations are applied that prohibit it from being extended. A unique feature of enclosure 20 is that it is accessible in both the extended and retracted positions.

2. Frame—Frame 504 provides the overall structural support for enclosure 20. It permits enclosure 20 to be secured to the window frame 504 or the window opening. The frame 504 can also be an integral part of the window structure. The frame 504 is not a part of the present invention, however for convenience could be packaged and sold along with enclosure 20.

3. Hinges—The upper hinge 50 mounts on the frame 504 structure and joins to swing arms 58 and 60. The front 26 of enclosure 20 is connected to the lower hinge 52. These hinges in combination with the swing arms permit enclosure 20 to be extended and retracted while remaining in an acceptable upright position. The upper hinge 50 as well as the lower hinge 52 are mounted parallel to the structure wall 500. The combining action of the two hinges with the swing arms keep enclosure 20 properly aligned during extension and retraction.

4. Swing arms—Swing arms 34 and 40 combined with the upper 50 and lower hinges 52 permit enclosure 20 to move so that it remains essentially upright relative to the structure floor and squared with the window (aperture) opening. Remaining square during extension and retraction is essential to prevent binding.

5. Top of the enclosure—The top 22 of the enclosure is uniquely shaped with a taper to give needed clearance during the swinging motion of retraction and extension. The tapered top also provides for water run off when the enclosure is in the extended position.

6. Bottom of the enclosure—The bottom 24 is uniquely fashioned to allow needed clearance during extension and retraction. It also combines with the sides to provide needed tracking of enclosure 20 as it is supported by the rollers. The bottom 24 and the bottom edge of the sides are shaped to permit cam like action on enclosure 20 during the motions of retraction and extension. This is necessary to provide the unique locking or nesting position of the rear panel as the limits of retraction and extension are approached. The motion must also allow for slight forward tilting to secure the top lip of the rear of the enclosure in the downward lip, and then permit return to an upright position.

7. Shaped groove on sides and bottom—This shaped groove or track is an integral part of the sides and the bottom. It can be made into the side and bottom or shaped with a metal channel material in a fashion to track on the roller for the desired motions of the enclosure. The taper at the end of each end of the groove permits the roller to apply needed pressure in the proper direction to hold the enclosure stable at each end of travel for retraction and extension.

8. Rollers—Rollers 58 and 60 are mounted on frame 504 to permit smooth, easy movement during extension and retraction. Rollers 58 and 60 are made of durable metal or plastic to provide low friction for the needed unique movement of enclosure 20. The roller applies pressure in the recessed areas or detented areas to hold the enclosure in position at rest. Gravity keeps pressure on the top inside seal during extension while the roller secures the bottom edge. These forces adequately compress the seals to adequately keep undesirable weather element out of the vehicle.

9. Sides of the enclosure—The sides 30 and 32 along the top, bottom, front and back shape enclosure 20 and maximize the interior space. The sides are matched with the opening frame sides to permit unbinding motion as enclosure 20 moves between the extended and retracted positions. The shape of the sides combine with the top and bottom to permit enclosure 20 to track in and out as needed throughout it's range of motion in an substantially upright position.

10. Rear of the enclosure—The rear 29 of enclosure 20 is flat and seals the opening when enclosure 20 is in the retracted position. It is shaped to the opening and it's top edge mates with the downwardly opening lip of frame 504 to secure the unit in the retracted position. A weather seal is around it's perimeter, that seals against the opening's mating surfaces. As the tracking motion tilts enclosure 20 slightly as it approaches the limits of retraction motion, the top lip of the rear of enclosure 20 slides under the downwardly opening lip to secure the rear of the enclosure in position.

11. Movement of the enclosure—Enclosure 20 may be moved between the extended and retracted positions using mechanical, electrical, or hydraulic movement means which are well known in the art.

The preferred embodiments of the invention described herein are exemplary and numerous modifications, variations, and rearrangements can be readily envisioned to achieve an equivalent result, all of which are intended to be embraced within the scope of the appended claims.

I claim:

1. An extendable and retractable enclosure for a structure having a wall having an aperture having a perimeter, a frame disposed around the perimeter of the aperture, the frame having a bottom portion, an inside top portion, an outside top portion, and a downwardly projecting lip horizontally disposed along the outside top portion, said enclosure comprising:

a top, a bottom, a front having a bottom portion, a rear, a first side and an opposite second side;
a first swing arm having a top end and an opposite bottom end;
a second swing arm having a top end and an opposite bottom end, said second swing arm spaced apart from said first swing arm;
said top ends of said first and second swing arms pivotally connectable to the inside top portion of the frame;
said bottom ends of said first and second swing arms pivotally connectable to said bottom portion of said front;
wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall;
a top member connecting said top end of said first swing arm to said top end of said second swing arm;
a bottom member connecting said bottom end of said first swing arm to said bottom end of said second swing arm;
a first elongated hinge connectable between the inside top portion of the frame and said top member; and,
a second elongated hinge connectable between said bottom member and said bottom portion of said front.

2. An extendable and retractable enclosure for a structure having a wall having an aperture having a perimeter, a frame disposed around the perimeter of the aperture, the frame having a bottom portion, an inside top portion, an outside top portion, and a downwardly projecting lip horizontally disposed along the outside top portion, said enclosure comprising:

a top, a bottom, a front having a bottom portion, a rear, a first side and an opposite second side;
a first swing arm having a top end and an opposite bottom end;
a second swing arm having a top end and an opposite bottom end, said second swing arm spaced apart from said first swing arm;
said top ends of said first and second swing arms pivotally connectable to the inside top portion of the frame;
said bottom ends of said first and second swing arms pivotally connectable to said bottom portion of said front;
wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall; and,
said bottom of said enclosure including a first curved portion spaced apart from a second curved portion.

3. The extendable and retractable enclosure of claim 2, further including:

a first roller;
a second roller spaced apart from said first roller;
said first and second rollers connectable to the bottom portion of the frame, wherein said first and second rollers upwardly project from the bottom portion of the frame; and,
said first roller engaging said first curved portion, and said second roller engaging said second curved portion.

4. The extendable and retractable enclosure of claim 3, further including:

said first and second rollers each including a biasing mechanism which urges said rollers in an upward direction.

5. The extendable and retractable enclosure of claim 3, further including:
   said first curved portion including first and second notches for receiving said first roller;
   said second curved portion including first and second notches for receiving said second roller; and,
   wherein said first notches are for receiving said rollers when said enclosure is in said extended position, and said second notches are for receiving said rollers when said enclosure is in said retracted position.

6. The extendable and retractable enclosure of claim 2, further including:
   said rear of said enclosure having a top horizontal lip; and,
   said first and second spaced apart curved portions shaped and dimensioned so that when said enclosure is moved to said retracted position, said top horizontal lip of said rear becomes seated under the downwardly projecting lip of the outside top portion of the frame.

7. An extendable and retractable enclosure for a structure having a wall having an aperture having a perimeter, a frame disposed around the perimeter of the aperture, the frame having a bottom portion, an inside top portion, an outside top portion, and a downwardly projecting lip horizontally disposed along the outside top portion, said enclosure comprising:
   a top, a bottom, a front having a bottom portion, a rear, a first side and an opposite second side;
   a first swing arm having a top end and an opposite bottom end;
   a second swing arm having a top end and an opposite bottom end, said second swing arm spaced apart from said first swing arm;
   said top ends of said first and second swing arms pivotally connectable to the inside top portion of the frame;
   said bottom ends of said first and second swing arms pivotally connectable to said bottom portion of said front;
   wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall; and,
   said top of said enclosure forming an acute included angle with said front of said enclosure.

8. An extendable and retractable enclosure for a structure having a wall having an aperture having a perimeter, a frame disposed around the perimeter of the aperture, the frame having a bottom portion, an inside top portion, an outside top portion, and a downwardly projecting lip horizontally disposed along the outside top portion, said enclosure comprising:
   a top, a bottom, a front having a bottom portion, a rear, a first side and an opposite second side;
   a first swing arm having a top end and an opposite bottom end;
   a second swing arm having a top end and an opposite bottom end, said second swing arm spaced apart from said first swing arm;
   said top ends of said first and second swing arms pivotally connectable to the inside top portion of the frame;
   said bottom ends of said first and second swing arms pivotally connectable to said bottom portion of said front;
   wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall;
   a top member connecting said top end of said first swing arm to said top end of said second swing arm;
   a bottom member connecting said bottom end of said first swing arm to said bottom end of said second swing arm;
   a first elongated hinge connectable between the inside portion of the frame and said top member;
   a second elongated hinge connectable between said bottom member and said bottom portion of said front;
   said bottom of said enclosure including a first curved portion spaced apart from a second curved portion;
   a first roller;
   a second roller spaced apart from said first roller;
   said first and second rollers connectable to the bottom portion of the frame, wherein said first and second rollers upwardly project from the bottom portion of the frame;
   said first roller engaging said first curved portion, and said second roller engaging said second curved portion;
   said first and second rollers each including a biasing mechanism which urges said roller in an upward direction;
   said first curved portion including first and second notches for receiving said first roller;
   said second curved portion including first and second notches for receiving said second roller;
   wherein said first notches are for receiving said rollers when said enclosure is in said extended position, and said second notches are for receiving said rollers when said enclosure is in said retracted position;
   said rear of said enclosure having a top horizontal lip;
   said first and second spaced apart curved portions shaped and dimensioned so that when said enclosure is moved to said retracted position, said top horizontal lip of said rear becomes seated under the downwardly projecting lip of the outside top portion of the frame; and,
   said top of said enclosure forming an acute included angle with said front of said enclosure.

9. An extendable and retractable enclosure for a structure having a wall having an aperture, the aperture having a bottom edge, an inside top portion, and an outside top portion, said enclosure comprising:
   a top, a bottom, a front having a bottom portion, a rear, a first side and an opposite second side;
   a first swing arm having a top end and an opposite bottom end;
   a second swing arm having a top end and an opposite bottom end, said second swing arm spaced apart from said first swing arm;
   said top ends of said first and second swing arms pivotally connectable to the inside top portion of the aperture;
   said bottom ends of said first and second swing arms pivotally connectable to said bottom portion of said front; and,
   wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall;
   a top member connecting said top end of said first swing arm to said top end of said second swing arm;
   a bottom member connecting said bottom end of said first swing arm to said bottom end of said second swing arm;

a first elongated hinge connectable between the inside top portion of the aperture and said top member; and, a second elongated hinge connectable between said bottom member and said bottom portion of said front.

10. An extendable and retractable enclosure for a structure having a wall having an aperture, the aperture having a bottom edge, an inside top portion, and an outside top portion, said enclosure comprising:

a top, a bottom, a front having a bottom portion, a rear, a first side and an opposite second side;

a first swing arm having a top end and an opposite bottom end;

a second swing arm having a top end and an opposite bottom end, said second swing arm spaced apart from said first swing arm;

said top ends of said first and second swing arms pivotally connectable to the inside top portion of the aperture;

said bottom ends of said first and second swing arms pivotally connectable to said bottom portion of said front; and, wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall; and, said bottom of said enclosure including a curved portion, wherein as said enclosure is moved said curved portion slides over the bottom edge of the aperture.

11. The extendable and retractable enclosure of claim 10, further including:

said curved portion including first and second notches for receiving the bottom edge of the aperture; and, wherein said first notch is for receiving the bottom edge of the aperture when said enclosure is in said extended position, and said second notch is for receiving the bottom edge of the aperture when said enclosure is in said retracted position.

12. An extendable and retractable enclosure for a structure having a wall having an aperture, the aperture having a bottom edge, an inside top portion, and an outside top portion, said enclosure comprising:

a top, a bottom, a front having a bottom portion, a rear, a first side and an opposite second side;

a first swing arm having a top end and an opposite bottom end;

a second swing arm having a top end and an opposite bottom end, said second swing arm spaced apart from said first swing arm;

said top ends of said first and second swing arms pivotally connectable to the inside top portion of the aperture;

said bottom ends of said first and second swing arms pivotally connectable to said bottom portion of said front; and, wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall; and, said top of said enclosure forming an acute included angle with said front of said enclosure.

13. An extendable and retractable enclosure for a structure having a wall having an aperture, the aperture having a bottom edge, an inside top portion, and an outside top portion, said enclosure comprising:

a top, a bottom, a front having a bottom portion, a rear, a first side and an opposite second side;

a first swing arm having a top end and an opposite bottom end;

a second swing arm having a top end and an opposite bottom end, said second swing arm spaced apart from said first swing arm;

said top ends of said first and second swing arms pivotally connectable to the inside top portion of the aperture;

said bottom ends of said first and second swing arms pivotally connectable to said bottom portion of said front; and, wherein said swing arms movably support said enclosure, and allow said enclosure to be selectively moved to one of (1) an extended position wherein said enclosure protrudes outwardly from the wall, and (2) a retracted position wherein said enclosure protrudes inwardly from the wall;

a top member connecting said top end of said first swing arm to said top end of said second swing arm;

a bottom member connecting said bottom end of said first swing arm to said bottom end of said second swing arm; and, a first elongated hinge connectable between the inside top portion of the aperture and said top member;

a second elongated hinge connectable between said bottom member and said bottom portion of said front;

said bottom of said enclosure including a curved portion, wherein as said enclosure is moved said curved portion slides over the bottom edge of the aperture;

said curved portion including first and second notches for receiving the bottom edge of the aperture;

wherein said first notch is for receiving the bottom edge of the aperture when said enclosure is in said extended position, and said second notch is for receiving the bottom edge of the aperture when said enclosure is in said retracted position; and, said top of said enclosure forming an acute included angle with said front of said enclosure.

* * * * *